United States Patent [19]

de Langavant

[11] Patent Number: 4,986,086
[45] Date of Patent: Jan. 22, 1991

[54] CO₂ TEMPERATURE CONTROL SYSTEM FOR TRANSPORT VEHICLES

[75] Inventor: Bernard C. de Langavant, Westmount, Canada

[73] Assignee: Fridev Refrigeration Systems, Inc., Westmount, Canada

[21] Appl. No.: 395,801

[22] Filed: Aug. 18, 1989

[51] Int. Cl.⁵ .................................................. B60H 1/32
[52] U.S. Cl. ........................................ 62/239; 62/52.1; 62/208
[58] Field of Search ................ 62/52.1, 78, 208, 210, 62/211, 225, 239

[56]  References Cited
U.S. PATENT DOCUMENTS

| | | | |
|---|---|---|---|
| 3,258,931 | 7/1966 | Kelly et al. | 62/52.1 |
| 3,287,925 | 11/1966 | Kane et al. | 62/239 |
| 3,385,073 | 5/1968 | Snelling | 62/52.1 |
| 3,525,235 | 8/1970 | Mauer | 62/52.1 |
| 3,803,859 | 4/1974 | Kleffmann et al. | 62/52.1 |
| 3,913,344 | 10/1975 | Holloway et al. | 62/208 |
| 4,163,369 | 8/1979 | Owen | 62/208 |
| 4,576,010 | 3/1986 | Windecker | 62/239 |
| 4,833,892 | 5/1989 | Wassibauer et al. | 62/78 |

Primary Examiner—Ronald C. Capossela
Attorney, Agent, or Firm—Helfgott & Karas

[57] ABSTRACT

A cooling system for an enclosure comprising an evaporator containing cryogen in liquid and gaseous phases, a vent coupled to the evaporator to release excess pressure therefrom as a result of heat absorbed by the cryogen, and a controller for the vent to produce a generally cyclical pressure variation in the evaporator having an amplitude selected in accordance with the desired heat absorption capacity of the cooling system.

33 Claims, 9 Drawing Sheets

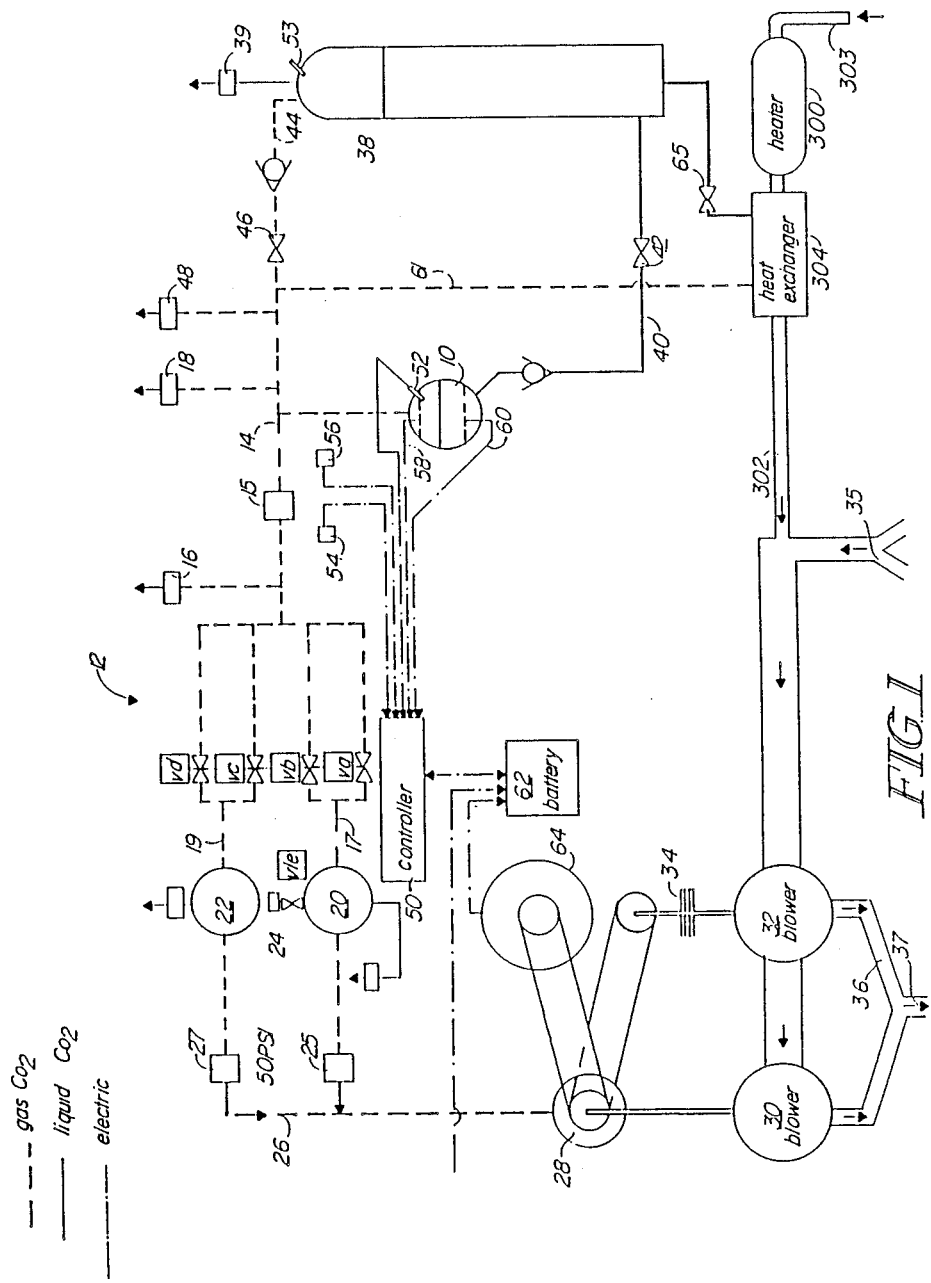

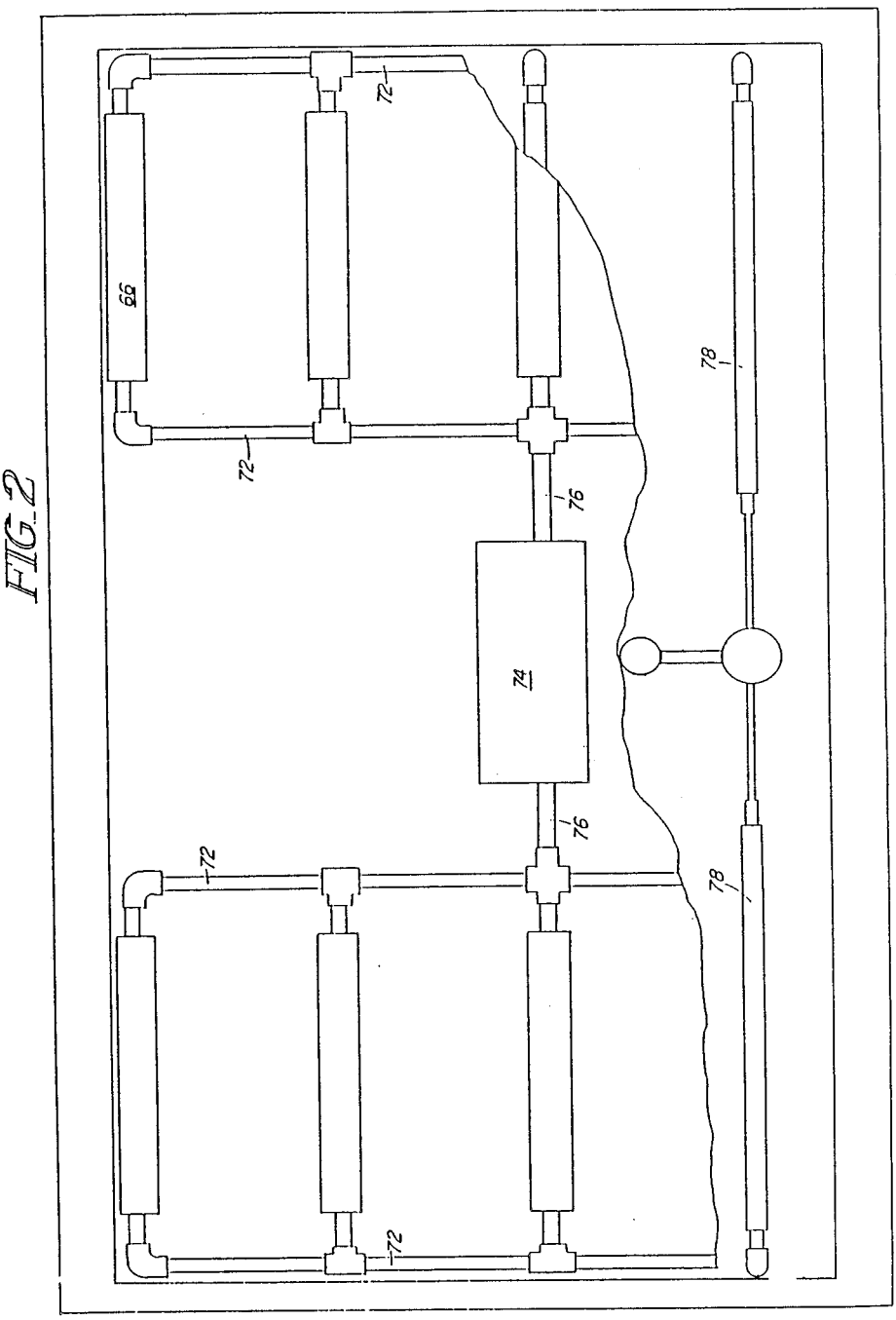

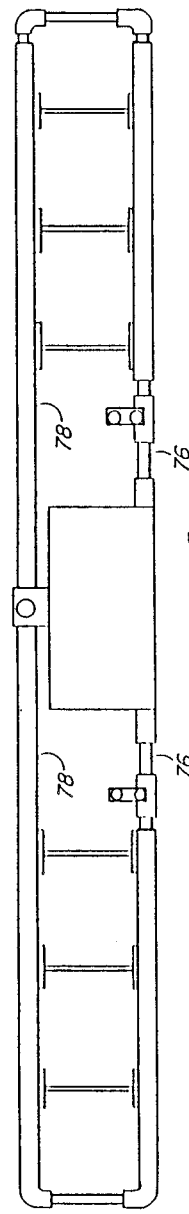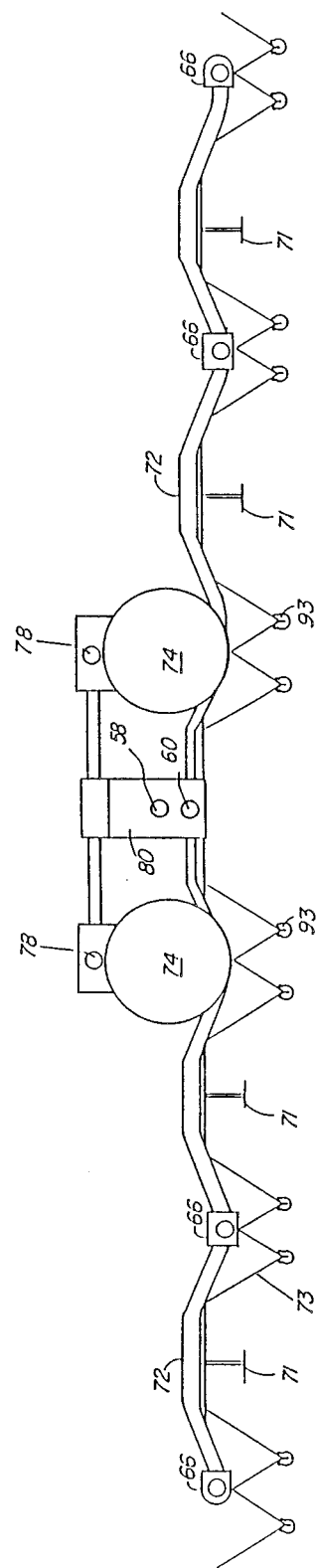

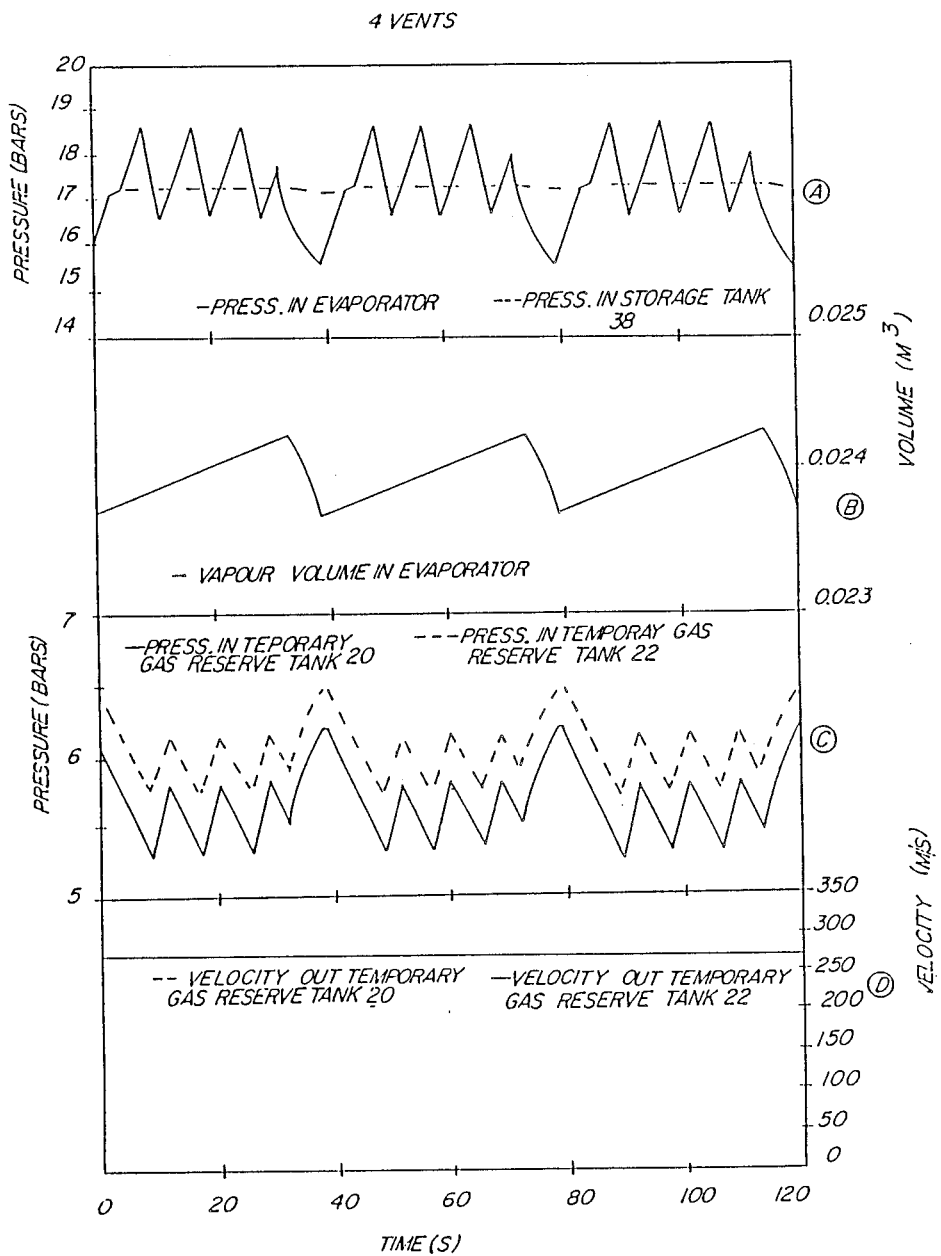
FIG_12

$CO_2$ TEMPERATURE CONTROL SYSTEM FOR TRANSPORT VEHICLES

FIELD OF THE INVENTION

The present invention relates to the general field of temperature control and, more particularly, to a cryogenic cooling system and to a method for cooling an insulated enclosure, well suited for transport vehicles such as straight body trucks, trailer trucks, railroad cars or the like. The invention also extends to the combination of a cryogenic cooling system and a heater unit to achieve a temperature control under a Wide range of environmental conditions.

BACKGROUND OF THE INVENTION

A transport vehicle for perishable goods is, by definition, an insulated storage chamber where products are maintained at a predetermined temperature during the transportation by means of a heating/cooling system. For a good performance, the heating/cooling system must have the ability to quickly absorb heat or cold which could penetrate the chamber, as well as the heat generated by certain type of products, in order to maintain the product in a satisfactory condition.

Mechanical refrigeration is the standard for refrigerated transport vehicles eventhough it has been widely recognized that this temperature control approach is quite complex and does not guarantee the basic requirements outlined above.

In an attempt to upgrade the dependability and the cooling capability of refrigerated transport vehicles and avoid dessication problems as well as unadequate air circulation associated with mechanical refrigeration, cryogenic cooling systems have been developed during the past recent years, theoretically outperforming by far mechanical refrigeration units.

Cryogenic cooling has evolved along two different approaches to solve the problem of temperature control. The injection approach is the simplest one. It consists of spraying liquid cryogen, such as $CO_2$ kept under high pressure and low temperature, directly into the insulated enclosure at atmospheric pressure. Immediately, dry snow (solid $CO_2$) and $CO_2$ vapors at $-110°$ F. are formed. As the dry snow sublimates, it absorbs heat at the rate of 246 Btu per pound of snow, or at 120 Btu per pound of liquid $CO_2$ injected.

The major drawback of the direct injection method resides in that it does not guarantee a uniform temperature. The injected $CO_2$ can reduce the temperature of the enclosure in an uncontrolled manner and so rapidly to a point where damage to the stored product may occur, especially when the $CO_2$ comes in direct contact with a sensitive product. In addition, the $CO_2$ rarefies the oxygen in the enclosure causing problems to human beings and to some breathing products. For all these reasons, the injection technique is mostly used for freezing where precise temperature control is not really essential.

The other approach, usually referred to as "vaporization" consists in recuperating the latent heat obtained when liquid $CO_2$ converts to gas inside an evaporator. This method allows a more precise temperature control and does not affect the oxygen content of the atmosphere in the storage chamber.

Cooling systems, based on the vaporization approach, are definitely an improvement over cryogen injection units in terms of temperature control, however they are still far from being fully satisfactory in this respect.

OBJECTS AND STATEMENT OF THE INVENTION

An object of the present invention is an improved cryogenic cooling system of the vaporization type.

Another object of the invention is a vaporization type cryogenic cooling system and a method for cooling an insulated enclosure that allows to maintain a more precise and uniform temperature in the insulated enclosure, comparatively to conventional systems.

A further object of the invention is a cryogenic cooling system of the vaporization type with a ventilation system for the insulated enclosure, whose operation is regulated in accordance With the heat absorption rate of the cooling system.

Another object of the invention is a cryogenic cooling system of the vaporization type whose components are arranged to reduce the heat infiltration in the insulated enclosure.

Yet, a further object of the invention is a temperature control system with a cryogenic cooling unit and a heating device that can draw power from vaporized cryogen.

In accordance with one aspect of the invention, there is provided a cryogenic cooling system comprising an evaporator thermally coupled to the enclosure to be refrigerated, containing cryogen in liquid and gaseous phases. The preferred crYogen is $CO_2$ which is both inexpensive and readily available, however, any other suitable substance may be used.

The pressure of $CO_2$ in the evaporator is adjusted by a vent whose operation is controlled by a system, preferably of the type that regulates the vent operation in accordance with data from various sensors such as a temperature sensor in the insulated enclosure and a pressure sensor in the $CO_2$ evaporator.

As part of the liquid $CO_2$ evaporates when it absorbs heat from the insulated enclosure, the total pressure in the evaporator increases up to a level where the control system commands the vent to release some gaseous $CO_2$ in order to reduce the pressure in the evaporator. The spread between the vent opening and closing pressures determines the amount of $CO_2$ converting from liquid to gas, between two vent openings.

The amplitude of the pressure variation in the evaporator resulting from the vent operation is controlled in accordance with the heat absorption rate of the evaporator for, in turn, obtaining a steadier discharge rate of vaporized $CO_2$ from the evaporator.

A ventilation system comprising ducts and a gas operated fan is provided to obtain a more homogenous temperature in the insulated enclosure by creating a slight air current therein preventing the formation of warm spots. The gas fan is powered by vaporized $CO_2$ escaping the evaporator and as a result of the regulated $CO_2$ discharge, a steady fan operation is obtained.

In a preferred embodiment, the method to control the heat absorption rate by the evaporator consists of adjusting the average $CO_2$ pressure therein. Thus, when the system operates at a high capacity, the average $CO_2$ pressure is relatively low and the spread betWeen the vent opening and closing pressures is large, and conversely, at minimum capacity the average $CO_2$ pressure is relatively high and the spread between the vent opening and closing pressures is small. The above translates into a large quantity of cryogen gas generated at maximum capacity, driving the ventilation fan fast, and into a lesser quantity of gas at minimum capacity driving the fan slowly by adjusting the spread between the vent opening and closing pressures in accordance With the gas volume to be generated by the evaporator, a steadier ON-OFF cycling frequency of the evaporator vent is obtained allowing to keep the blower in a quasi-continuous operation while the evaporator absorbs heat, regardless of the amount of gas produced.

By comparison, a system with a constant pressure differential between the vent opening and closing pressures throughout the entire average $CO_2$ pressure range in the evaporator, would result into a considerable variation in the ON-OFF cycling frequency of the vent. At maximum capacity, the vent will cycle very quickly, continuously supplying gas to the ventilation blower. However, at minimum capacity, the cycling frequency will be much lower, supplying gas to the blower in bursts at long intervals, possibly causing the blower to cease its operation between two consecutive bursts due to the lack of operating fluid.

For a more stable operation of the blower, it is preferred to store the exhausted $CO_2$ in a temporary gas reserve tank before it is being supplied to the gas fan. The location of the temporary gas reserve tank is not a critical element for the satisfactory operation of the cooling system. However, it has been found that an advantage may be gained by locating this tank so that it can intercept heat which otherwise would have penetrated in the enclosure. This is particularly advantageous for refrigerated transport vehicles where the insulation of the enclosure must be limited due to space considerations, especially in the floor region which constitutes a major area of heat infiltration.

It has been found that locating the temporary gas reserve tank underneath the floor reduces heat infiltration because the $CO_2$ stored therein is cold and will absorb heat.

For added versatility, the cooling system is preferably coupled to a heating unit which allows to obtain an adequate temperature in the insulated enclosure when the outside temperature is below the freezing point. The heating unit is of conventional construction, of the diesel type for example, coupled to the ventilation system to supply hot air therein. For situations where no external power source is available and when the heat requirement is limited, $CO_2$ gas may be released from a $CO_2$ reserve tank to drive a generator supplying electric current to the diesel glow plugs, the gas also driving the blower of the ventilation system to obtain an adequate warm air circulation through the same ducting system used to convey cool air. If the liquid $CO_2$ in the reserve tank is too cold to generate vapours, the liquid $CO_2$ is warmed up through a heat exchanger located in the ventilation ducts.

Therefore, the present invention comprises, in a general aspect, a cooling system for an insulated enclosure, comprising:

an evaporator thermally coupled to the enclosure, the evaporator containing cryogen in liquid and gaseous phases, heat from the enclosure transferred to the liquid to the gaseous phase which increases the pressure in the evaporator;

vent means coupled to the evaporator, the vent means being capable to assume an opened and closed condition in the opened condition the vent means releasing gaseous cryogen from the evaporator to reduce the pressure therein, in the closed condition the vent means preventing release of cryogen from the evaporator;

control means for commanding the vent means to assume the opened and closed conditions at respective and predetermined vent opening and closing pressures of cryogen in the evaporator, the control means constituting means for varying the pressure differential defined between the vent opening and closing pressures of cryogen in accordance with the heat absorption rate of the cooling system for regulating the rate of cryogen discharge from the evaporator in accordance with the heat absorption rate;

ventilation means for creating an air current in the enclosure, including:
  (a) duct means for conveying air; and
  (b) gas powered fan means in the duct means to propel air therein, the vent means being coupled to the fan means for supplying thereto operating gaseous cryogen.

The invention also extends to a transport vehicle, comprising:
  a top wall;
  a bottom wall;
  side walls, these Walls defining an insulated enclosure;
  door means on one of the walls for accessing the enclosure;
  a cooling system for the enclosure, including:
  (a) an evaporator mounted to the top wall, the evaporator containing cryogen in liquid and gaseous phases, heat from the enclosure transferred to the evaporator causing cryogen therein to convert from the liquid to the gaseous phase which increases the pressure in the evaporator;
  (b) vent means coupled to the evaporator, the vent means being capable to assume an opened and closed condition, in the opened condition the vent means releasing gaseous cryogen from the evaporator to reduce the pressure therein, in the closed condition the vent means preventing release of cryogen from the evaporator;
  (c) control means for commanding the vent means to assume the opened and closed conditions, at respective and predetermined vent opening and closing pressures of cryogen in the evaporator, the control means constituting means for varying the pressure differential defined between the vent opening and closing pressures of cryogen in accordance with the heat absorption rate of the cooling system for regulating the rate of cryogen discharge from the evaporator in accordance With the heat absorption rate;
  (d) ventilation means for creating an air current in the enclosure, including:
    (i) duct means for conveying air; and
    (ii) gas powered fan means in the duct means to propel air therein, the vent means being coupled to the fan means for supplying thereto operating gaseous cryogen.

The invention also comprehends a temperature control system for an insulated enclosure, comprising:

a cooling system for an insulated enclosure, comprising:

an evaporator thermally coupled to the enclosure, the evaporator containing cryogen in liquid and gaseous phases, heat from the enclosure transferred to the evaporator causing cryogen therein to convert from the liquid to the gaseous phase which increases the pressure in the evaporator;

vent means coupled to the evaporator, the vent means being capable to assume an opened and closed condition, in the opened condition the vent means releasing gaseous cryogen from the evaporator to reduce the pressure therein, in the closed condition the vent means preventing release of cryogen from the evaporator;

control means for commanding the vent means to assume the opened and closed conditions at respective and predetermined vent opening and closing pressures of cryogen in the evaporator, the control means constituting means for varying the pressure differential defined between the vent opening and closing pressures of cryogen in accordance with the heat absorption rate of the cooling system for regulating the rate of cryogen discharge from the evaporator in accordance with the heat absorption rate;

ventilation means for creating an air current in the enclosure, including:
(a) duct means for conveying air; and
(b) gas powered fan means in the duct means to propel air therein, the vent means being coupled to the fan means for supplying thereto operating gaseous cryogen.

a heating unit coupled to the duct means for supplying warm air in the enclosure.

The invention further extends to a cooling system for an insulated enclosure, comprising, an evaporator thermally coupled to the enclosure, the evaporator containing cryogen in liquid and gaseous phases, heat from the enclosure transferred to the evaporator causing cryogen therein to convert from the liquid to the gaseous phase which increases the pressure in the evaporator;

vent means coupled to the evaporator for releasing gaseous cryogen therefrom to reduce the pressure in the evaporator;

control means for controlling the opening and closing operation of the vent means to cause a generally cyclical pressure variation in the evaporator having an amplitude selected in accordance With the desired heat absorption rate of the cooling system; and ventilation means for creating an air current in the enclosure, including:
(a) duct means for conveying air; and
(b) gas powered fan means in the duct means to propel air therein, the vent being coupled to the fan means for supplying thereto operating gaseous cryogen.

The invention further extends to a method for cooling an insulated enclosure, comprising the steps of:

placing cryogen in liquid and gaseous phases into an evaporator thermally coupled to the enclosure, the evaporator comprising vent means to release gaseous cryogen therefrom;

opening and closing said vent means to produce a generally cyclical pressure variation in the evaporator having an amplitude selected in accordance with the heat absorption rate of the evaporator;

conveying gaseous cryogen from the Vent means to a gas powered fan conveying air in duct means to create an air current in the enclosure.

BRIEF DESCRIPTION OF THE DRAWINGS

FIG. 1 is a schematical view of the cooling/ heating system in accordance with this invention;

FIG. 2 is a top view of the evaporator, some elements being omitted for clarity;

FIG. 3 is a vertical cross-sectional view of the evaporator;

FIG. 4 is a sectional view taken along lines 4-4 in FIG. 3;

FIG. 12a is a diagram of the $CO_2$ pressure in the evaporator and in the reserve tank with respect to time for a relativelY high heat absorption rate;

FIG. 12b is a diagram of the $CO_2$ vapour volume in the evaporator with respect to time for a relatively high heat absorption rate;

FIG. 12c is a diagram of the $CO_2$ pressure in the gas reserve tank with respect to time for a relatively high heat absorption rate; and FIG. 12d is a diagram of the velocity of $CO_2$ escaping the gas reserve tank, with respect to time, for a relatively high heat absorption rate.

DESCRIPTION OF A PREFERRED EMBODIMENT

Figure 5:
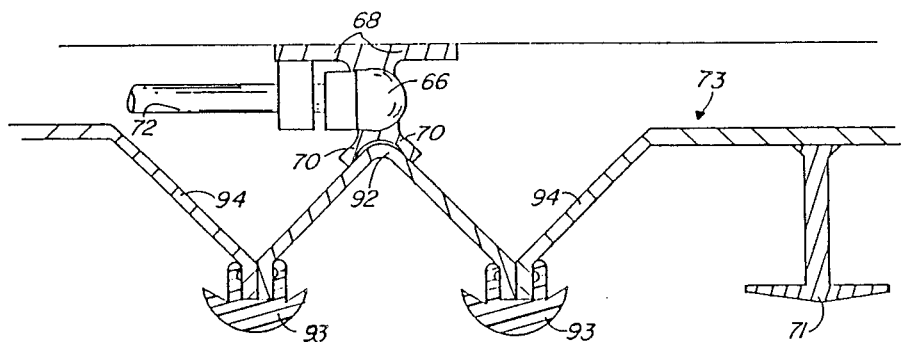
FIG. 5 is an enlarged schematical view illustrating the connection between the evaporator and an aluminum skin enhancing heat transfer.
Figure 6:
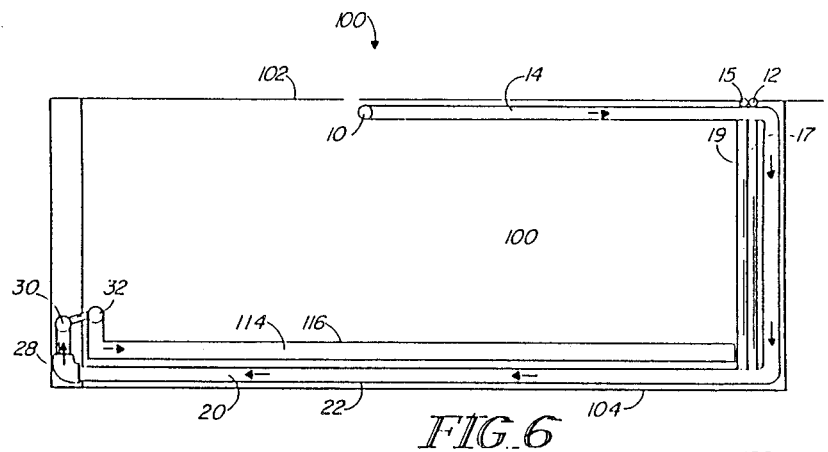
FIGS. 6, 7 and 8 are schematical views of an insulated enclosure illustrating the position of the temporary gas reserve tanks and the $CO_2$ flow path therefrom.
Figure 7:
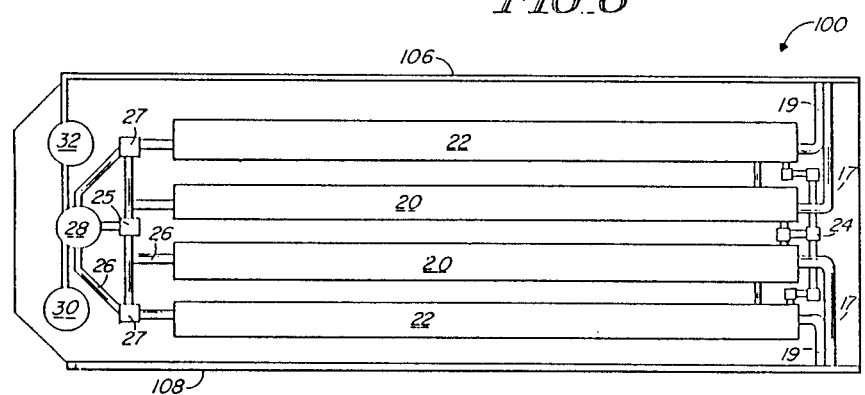

The cooling/heating system in accordance with the invention is particularly Well adapted for use on transport vehicles such as straight body trucks, truck trailers or railroad cars, that are designed for holding perishable goods at a stable temperature.

Referring to FIG. 1, the cooling system comprises an evaporator identified by the reference numeral 10 mounted in the insulated enclosure in order to absorb heat therefrom, for maintaining the temperature of the enclosure at a desired level. The evaporator 10 is a reservoir containing $CO_2$ in gaseous and liquid phases at a predetermined pressure which determines the heat absorption capacity of the system.

The pressure in the evaporator is controlled by a vent 12 constituted by four valves VA, VB, VC and VD respectively, connected to the evaporator 10 through a conduit 14. A reducer 15 set at 95 PSI is mounted in the gas line 14 for reducing the pressure of the $CO_2$ gas coming from the evaporator 10 to an easier level to handle. A safety vent 16 set at 110 PSI is also coupled to the gas line 14, downstream of the reducer 15 to discharge in the atmosphere the $CO_2$ gas should the pressure exceed the predetermined level. A safety vent 18 is also provided in the gas line 14, between the evaporator 10 and the reducer 15. The safety vent 18 is set at a pressure in the order of 450 PSI considered as a safe operating limit for the evaporator.

The $CO_2$ gas leaving the valves VA to VD is stored into temporary gas reserve tanks 20 and 22 before being supplied to a gas motor driving a ventilation fan, as it will be explained in detail hereinafter. The temporary gas reserve tank 20 is fed exclusively by valves VA and VB through conduit 17 and its pressure is maintained at a level below 60 PSI. The remaining vent valves, namely VC and VD feed exclusively the gas reserve tank 22 through conduit 19.

A valve 24 responsive to the pressure in the gas reserve tank 20 establishes a communication between the tanks 20 and 22 when the pressure in the primary tank 20 exceeds 60 PSI.

$CO_2$ gas is discharged from the tanks 20 and 22 into a gas line 26 through 30 PSI and 50 PSI reducers 25 and 27 respectively, to establish different pressure levels in the line 26 in accordance with the flow rate of $CO_2$ gas from the evaporator 10. The gas line 26 conveys $CO_2$ gas to a gas motor 28 driving two fans 30 and 32. The gas motor 28 is in a continuous driving relationship with the fan 30 whereas it is connected through an electric clutch 34 to the fan 32. When the gas motor 28 is supplied only from the reserve tank 20, the pressure in line 26 is in the order of 30 PSI and only the fan 30 operates. However, when the reserve tank 22 starts to discharge gas in the line 26, the pressure therein rises to 50 PSI and the electric clutch 34 is engaged so that both fans are operated.

The fans 30 and 32 convey air into a ventilation system including ducts 36 with inlet port 35 and an outlet port 37 both in the enclosure to be refrigerated. The purpose of this ventilation system is to provide an air circulation in the enclosure so as to create a uniform temperature therein, to prevent the formation of warm spots and to push hot air toward the top where the evaporator is located. It should be appreciated that this ventilation system is different from prior art devices where an air stream is blown against a heat exchanger for assisting the evaporation of the cryogen therein. In the present case, the ventilation serves basically to homogenize the temperature.

The evaporator 10 is supplied with liquid $CO_2$ from an insulated reserve tank 38, through a conduit 40 controlled by a valve 42. The transfer of liquid $CO_2$ from the reserve tank 38 to the evaporator 10 is effected by creating a pressure differential between the reserve tank 38 and the evaporator 10 by opening valve 42 and vent 12 to lower the pressure in the evaporator. It has been found that this system is extremely simple and dependable, however, the use of pumps or any other liquid transfer equipment is clearly within the scope of this invention.

The pressure in the reserve tank 38 is then rebuilt to its original value by transferring high pressure $CO_2$ gas from the evaporator 10 to the reserve tank 38 through a gas line 44 controlled by a Valve 46 which closes when the desired pressure is reached in the reserve tank 38.

A safety vent 48, set at 480 PSI, is provided in the line 44 and a safety vent 39 set at 350 psi is provided in the reserve tank 38 to burst in case of system failure.

The operation of the cooling system is controlled by a micro-processor based electronic controller 50 receiving information from various sensors. More particularly, there is a pressure sensor 52 in the evaporator 10, a pressure sensor 53 in the reserve tank 38, a temperature sensor 54 measuring the temperature in the insulated enclosure and a temperature sensor 56 for the outside temperature. High and low liquid levels switches 58 and 60 respectively, are provided in the evaporator 10 for providing information on the level of liquid $CO_2$ therein.

Based on signals provided by the sensors 52 to 60, the controller 50 will regulate the operation of the cooling system in accordance with the desired temperature in the enclosure. A more detailed description of the controller 50 will be provided hereinafter.

The controller 50 is powered by a generator 64, driven by the gas motor 28, recharging a battery 62 which provides electric poWer When the generator 64 is inoperative.

A diesel heating unit 300 is provided to generate warm air in the insulated enclosure When the outside temperature is too low, as during the winter season. The heater unit 300, of a generally conventional construction, is coupled to the ventilation ducts 36 by a conduit 302 through which warm air is supplied in the insulated enclosure.

The heating unit 300 has a dedicated air intake conduit 303 from the insulated enclosure.

It should be appreciated that the ducting system is such as to prevent hot air to be directly discharged from the heating unit 300 to the enclosure, by mixing the hot air channelled by the conduit 302 with cooler air drawn from the enclosure through the inlet port 35. This arrangement allows to raise the temperature of the enclosure steadily, preventing the formation of hot or cold spots therein.

When the heat requirement is minimal, such as when the temperature is close to the freezing point and when cooling and heating periods may alternate, the electric power required to operate the heater 300 is extracted by vaporizing $CO_2$ from the reserve tank 38 to drive the generator 64 and the fan 30 for creating an air circulation.

A heat exchanger 304, mounted in the conduit 302, is used to enhance the vaporization of liquid $CO_2$. The heat exchanger 304 conveys $CO_2$ from the reserve tank 38 to the line 14 through a conduit 61, so as to maintain a minimum pressure of 95 PSI in line 14 Which feeds the gas motor 28 driving the generator 64 and the fan 30. A valve 65 controls the fluid flow in the conduit 61.

However, when heat is required on a regular basis, the electric power required to operate the heating unit 300 is normally supplied from the generator of the pulling vehicle, continuously recharging the battery 62 and activating an electric blower (not-shown).

The concept of a cryogenic cooling/heating system described in relation to FIG. 1, may be advantageously adapted for a meat rail truck or trailer used for the transport of fresh beef carcasses. FIGS. 2 to 9 illustrate the various components of the cooling system when installed in a trailer of this type.

The evaporator 10, best illustrated in FIGS. 2, 3, 4 and 5, is installed at the top of the insulated chamber and comprises a plurality of extruded aluminum conduits 66, each conduit 66 being provided with two flanges 68 permitting attachment to the cross beams of the trailer roof, in direct contact with the aluminum ceiling of the trailer, and two flanges 70 in an inverted V-shape on which is mounted an aluminum skin 73 for a good thermal transfer between the conduits 66 and the insulated chamber.

The extruded aluminum conduits 66 are placed between the five meat rails 71 of the trailer. This arrangement creates six rows of two conduits 66 each, leaving an empty space right in the center of the trailer ceiling.

The extremities of the conduits 66 are connected together by four manifolds 72, two in the center and one at each extremity of the trailer. The manifolds are shaped to clear the meat rails 71 in the trailer, as best illustrated in FIGS. 3 and 5.

Two steel tanks 74 containing liquid $CO_2$ are mounted in the center of the trailer roof, between the two central manifolds 72 Which are coupled to the bottom of the tanks 74 by short conduits 76.

The manifolds 72 at the extremities of the trailer ceiling are connected to the top of each steel tank 74 by means of gas return conduits 78, best illustrated in FIGS. 2 and 4.

A vertically extending receptable 80, connected to the top and to the bottom of the tanks 74, is mounted therebetween and it is provided with the liquid level switches 58 and 60 for identifying maximum and minimum levels of liquid $CO_2$ in the tanks 74.

As best illustrated in FIG. 5, the portion of the aluminum sheet skin 73 associated with each conduit 66 comprises an inverted V-shaped central strip 92 fastened to the flanges 70 by means of fasteners, such as bolts. Strips 94 extend between each extremity of the central strip 92 and the ceiling of the trailer. The strips 92 and 94 completely enclose the respective conduit 66 a]1 along the ceiling of the trailer, between two meat rails 71. Drip pans 93 eXtend along and beloW the adjacent edges of the strips 92 and 94 to collect condensation water. It should be appreciated that the slanted walls of the strips 92 and 94 greatly assist in guiding the condensation droplets toward the drip pans 93.

The operation of the evaporator 10 is as follows.

When the trailer is moving on a flat road, the conduits 66 in the cargo space and the manifolds 72 are filled by gravity with liquid $CO_2$ which is coming down from the two steel tanks 74 inside the roof. These tanks 74 are supplied with fresh liquid $CO_2$ coming from the storage tank 38, as described earlier whenever the level of the liquid $CO_2$ inside the tanks 74 has reached a preset minimum as determined by the low level liquid switch 60. The transfer of liquid $CO_2$ from the storage tank 38 to the tanks 74 stops as soon as the level of the liquid $CO_2$ inside the tanks 74 has reached a preset maximum detected by the high level switch 58.

The gas return conduits 78 connecting the extremeties of the conduits 66 to the top of the tanks 74, are filled with gaseous $CO_2$, which is generated by the evaporation of liquid $CO_2$ whenever heat is transferred to the evaporator 10. The pressure in the evaporator can vary from 100 to 450 PSI, depending on the required heat absorption of the system.

Whenever the trailer is moving on an inclined road, part of the liquid $CO_2$ inside the conduits 66 will rise in the gas return conduits 78 which are at the low end of the trailer, while it slides out of the conduits 66 at the opposite end of the vehicle. This movement of the liquid inside the evaporator facilitates the evacuation of gaseous $CO_2$ from the conduits 66 toward the gas return conduits 78 and the top of the steel tanks 74.

Since the two st ®®1 tanks 74 are in the exact center of the ceiling, and since the volume of the conduits 66 has been calculated to be equal to the vòlume of the gas return conduits 78, the level of the liquid $CO_2$ inside the vertical receptacle 80 holding the two level switches 58 and 60, is very stable regardless of the inclination of the road.

The $CO_2$ exhaust and ventilation system of the trailer is illustrated in FIGS. 6 to 9 o±the drawings. The trailer, identified generallY by the reference numeral 100, comprises a top wall 102, a bottom wall 104 and side walls 106 and 108, respectively. The trailer walls are provided with insulation material as it is customary in the art, to reduce heat infiltration in the enclosure.

The temporary gas reserve tanks are located below the floor of the trailer 100 to limit heat infiltration therethrough. The tanks 20 and 22 are constituted by a series of rectangular shaped conduits extending the entire length of the trailer and connected to the vent 12, located in the rear section of the ceiling, by the conduits 17 and 19 running around the opening of the back doors. This arrangement is particularly advantageous in limiting heat infiltration through the floor and the doors because the $CO_2$ gas stored in these tanks and conduits is very cold after being relaxed to 95 psi by the reducer 15.

The gas line 26 coupled to the gas reserve tanks through the 50 PSI and 30 PSI reducers respectively, leads to the gas motor 28 operating at 3000 RPM maximum, with more or less horse-poWer depending of the gas supply pressure. The gas motor 28 is continuously in driving relationship with the bloWer 30 capable of delivering a maximum of 330 CFM at 3000 RPM. The second blower 32, identical to the blower 30, is operated by the gas motor 28 through a belt transmission 100 and an electric clutch 34 made responsive to the pressure in the gas line 26 by a system of known construction, including a pressure sensor to produce an engage/-disengage control signal.

The ducting system 36 comprises air intake sections 112 located at the top front of the refrigerated enclosure leading to the blowers 30 and 32, and outlet ducts 114 and 116, extending along the side walls 106 and 108 respectively, the entire length of the trailer close to the floor 104. The ducts 114 and 116 are provided with a plurality of outlet ports leading in the refrigerated enclosure so that air drawn from the top front of the enclosure is distributed evenly near the floor thereof.

Figure 8:
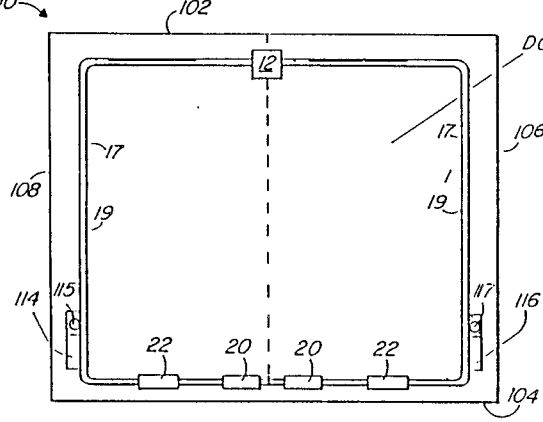
Figure 9:
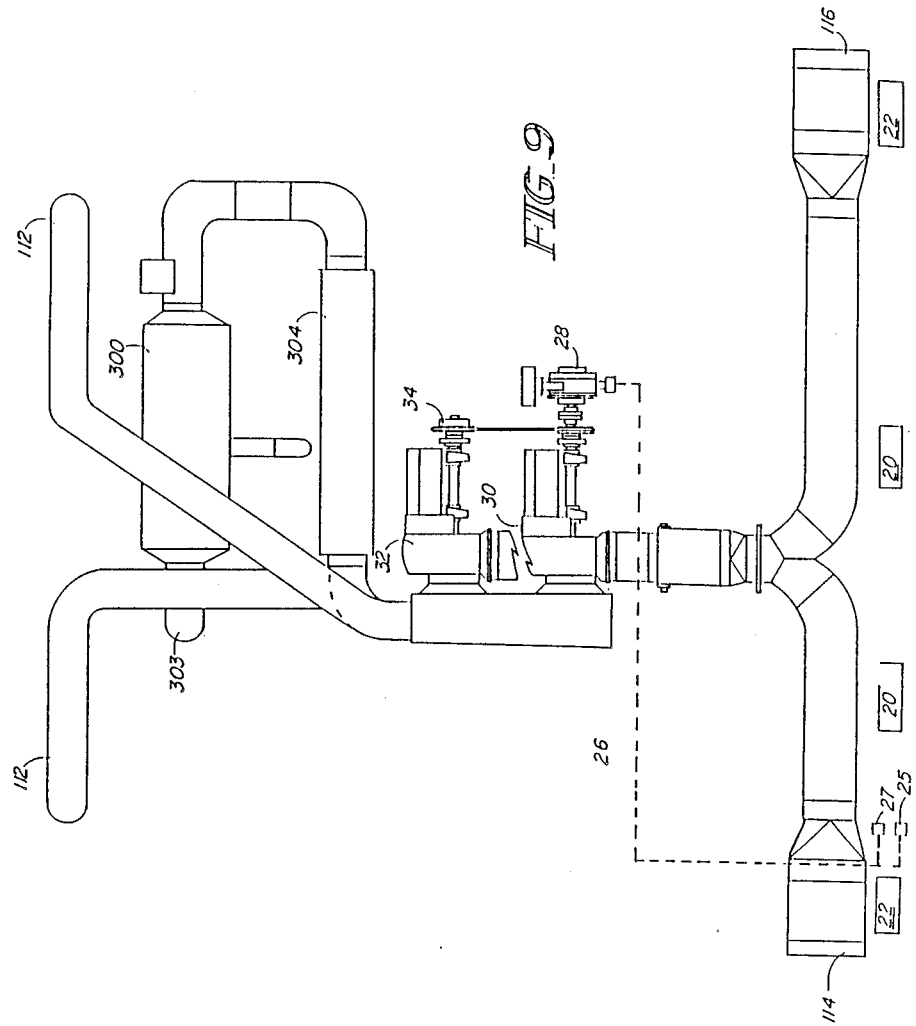
FIG. 9 is a vertical sectional view of the insulated enclosure showing the gas fans arrangement, the heating unit and part of the ventilation ducts.

For an increased efficiency, the cold $CO_2$ gas exhausted by the blowers 30 and 32 circulates through conduits 115 and 117 passing in the ventilation ducting system 114 and 116, as schematically illustrated in FIG. 8, to further cool the air circulating therein.

As gas $CO_2$ comes out of the valves VA or VA and VB, it progressively fills the tank 20; but, at the same time, it escapes by the 30 PSI reducer 25 in the gas line 26 to the gas motor 28 which activates blower 30. If ever the pressure inside tank 20 reaches 60 PSI, the excess pressure will go into tank 22. If the pressure in tank 22 is higher than in tank 20, then the air will escape in the gas line 26 through the 50 PSI reducer 27, and will activate blowers 30 and 32, considering that the electric clutch 34 will be engaged. Evidently, if VC or VC and VD are opened in addition to VA and VB, tank 22 will fill very quickly and the two blowers will operate in priority. The result is an air turbulence proportionate to the heat absorption rate of the system.

Figure 10:
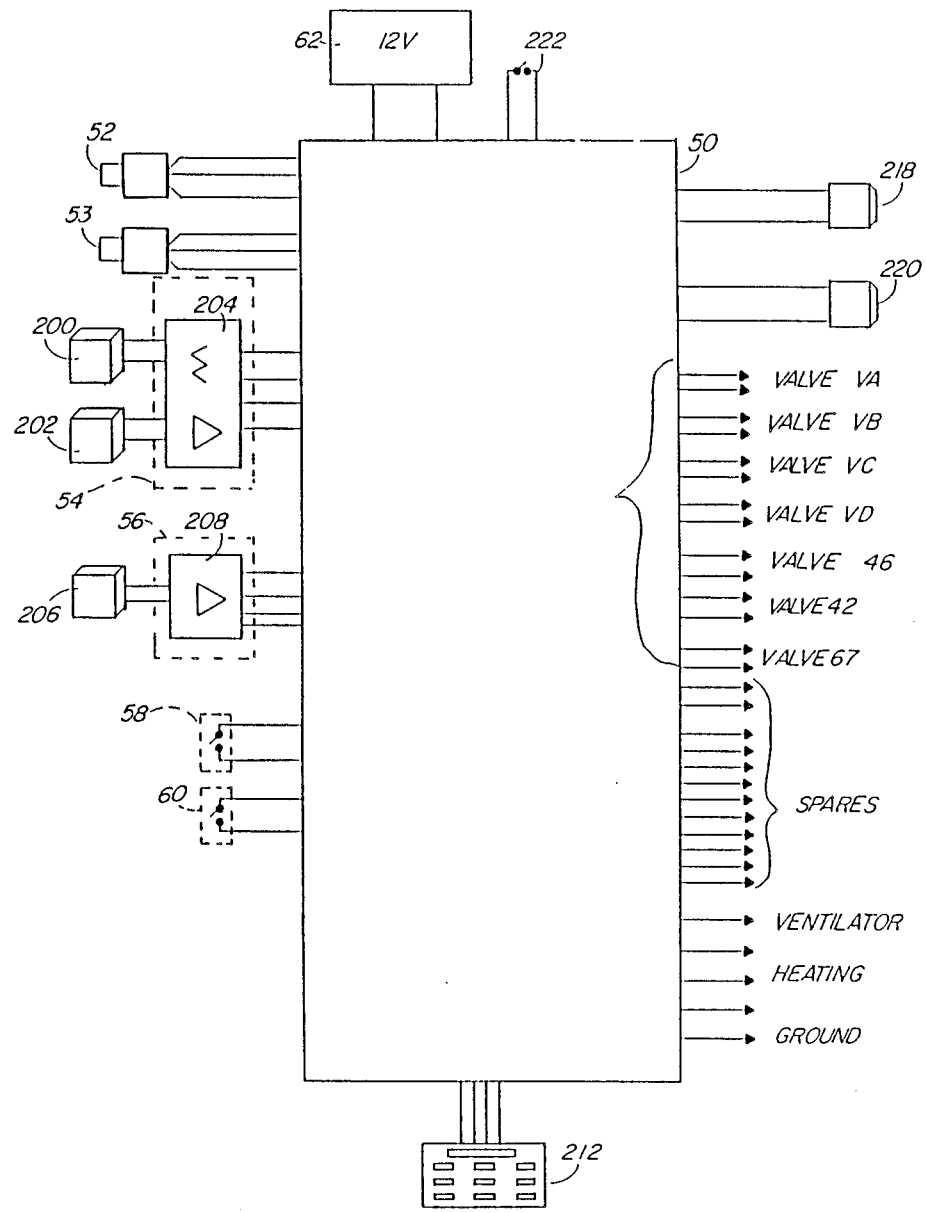
FIG. 10 is a schematical view of the electronic controller to regulate the operation of the cooling/heating system.

FIG. 10 illustrates a schematical diagram of the electronic controller 50. The controller is a microprocessor based circuit that receives data from various sensors and outputs command signals to the various pneumatic valves of the cooling system to control the operation thereof. In addition, data such as temperature settings for the refrigerated enclosure, are entered through a standard keyboard/display unit.

The pressure sensor 52 mounted in the evaporator 10 has an operating range from 0 to 500 PSI, and it is designed to perform accurate readings at relatively low temperatures. The pressure sensor commercialized under the trademark Omega, series 500, has been found satisfactory. The pressure sensor 53 mounted in the storage tank 38 is of identical construction.

The temperature sensor 54 measuring the temperature of the refrigerated enclosure is constituted by two sensor units 200 and 202 mounted at spaced locations in the refrigerated enclosure to alloW for average temperature measurements. The sensor units 200 and 202 are basically current sensors which require local amplification and signal processing due to the weak signal produced. In FIG. 10, the local processor is illustrated by 204 which comprises an amplifier section and an analog circuit to average the signals from sensors 200 and 202. The processor 204 then supplies the output signal to the controller 50. The temperature sensors, commercialized under the trademark Omega, series AD590, have been found satisfactory.

The outside temperature sensor 56 is similar in construction to a sensor 54 except that it comprises a single sensor unit 206, identical to the units 200 or 202, and a local amplifier 208.

The liquid level indicators 58 and 60 are in the form of micro switches coupled to the processor 50.

The data signals from the various sensors are processed by the controller 50 Which outputs control signals on lines 210 to regulate the operation of the vent 12 and the refilling of evaporator 10. The modification of the temperature setting in the refrigerated enclosure is performed through an input/output device 212. In a preferred embodiment, the input/output device 212 is an alphameric keyboard with a display. However, other types of input/output devices may also be used.

Electric power is supplied to the controller 50 by the generator 64 through the battery 62 or the generator of the pulling vehicle.

Two pilot lamps 218 and 220, such as LED (light emitting diode) are coupled to the controller 50 to indicate its operating condition. More particularly, the LED 218 indicates that power is being supplied to the controller, whereas the indicator 220 indicates a malfunction thereof.

To turn off the controller 50, for maintainance purposes for example, a switch 222 is provided which, when open, turns off the controller 50 and consequently, the entire cooling system.

The controller 50 contains a memory in which is stored the state (opened or closed) of each control valve for different operating conditions, in the form of a map. In accordance with a particular operating condition determined from data received from the various sensors, the processor accesses the particular memory slot corresponding to this operating condition and outputs therefrom the state of each controlled valve. This system is relatively simple and once properly programmed, allows to obtain consistant and trouble free operation.

The controller 50 is also provided with a self-diagnostic circuit which will indicate, through the LED 220, that a malfunction has occured and immediate attention is required.

The internal structure of the controller 50 is not an essential element to the invention considering that these types of controllers are relatively well known and commercially available. Therefore, a detailed description of the system is not deemed to be necessary here.

Figure 11:
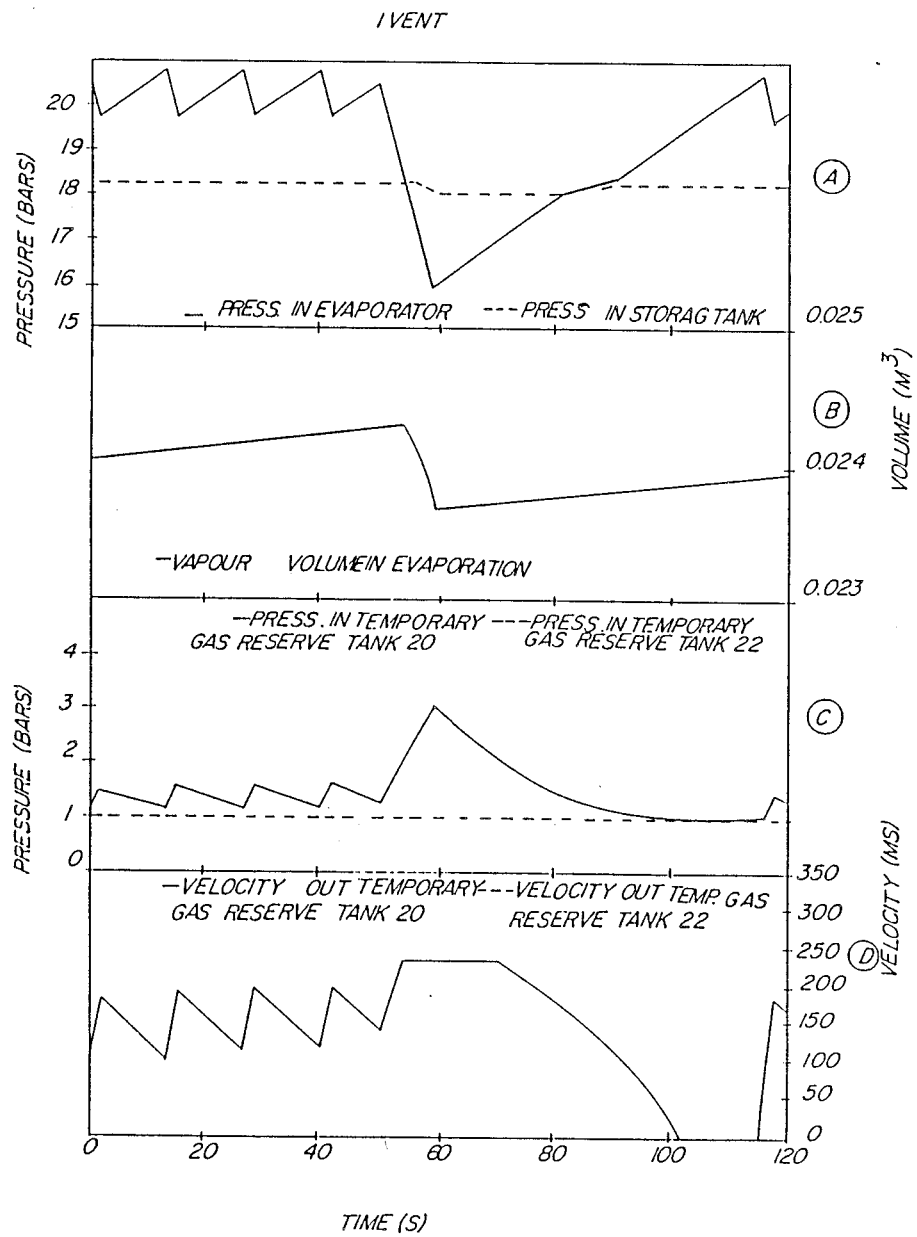
FIG. 11a is a diagram of the $CO_2$ pressure in the evaporator and in the reserve tank with respect to time for a relatively low heat absorption rate.
FIG. 11b is a diagram of the $CO_2$ vapour volume in the evaporator with respect to time for a relatively low heat absorption rate.
FIG. 11c is a diagram of the $CO_2$ pressure in the gas reserve tank with respect to time for a relatively low heat absorption rate.
FIG. 11d is a diagram of the velocity of $CO_2$ escaping the gas reserve tank, with respect to time, for a relatively low heat absorption rate.

The operation of the cooling sYstem, in accordance with this invention, will now be described in conjunction with FIGS. 1, 11 and 12.

Assuming that a certain quantity of liquid $CO_2$ is present in the evaporator !0 and that a large amount of heat is penetrating in the enclosure or is being generated by the transported product, the cooling system will operate at maximum capacity to absorb the heat quickly and stop the temperature rising inside the enclosure. At this end, the controller 50 will regulate the operation of the vent 12 so that the vent closing and opening pressures will be relativelY low and the spread between the vent opening and the vent closing pressure will be relatively large, allowing large amounts of $CO_2$ to vaporize between two vent openings. More particularly, this will be achieved by opening valves VA through VD in order to allow a maximum flow of $CO_2$ gas from the evaporator.

Due to the successive vent opening and vent closing operations, the pressure in the evaporator will vary in a somewhat cyclical manner, as illustrated in FIG. 12a. In this particular case, the actual evaporator pressure setting corresponding to the vent closing pressure, has been set at 16.0 bars, and the vent opening pressure has been set to 18.6 bars, whereby the amplitude of the pressure variation will be in the order of 2.6 bars.

The $CO_2$ gas leaving the vent 12 will fill both gas reserve tanks 20 and 22 and will flow through the gas line 26 at a pressure of about 50 PSI. As a result of the higher pressure in the gas line 26, the electric clutch 34 will be engaged and the gas motor 28 will drive both blowers 30 and 32 in order to create a maximum air current in the refrigerated enclosure as a result of a high heat absorption of the system.

As the evaporator 10 absorbs heat from the enclosure, liquid $CO_2$ converts to gas causing the level of liquid therein to progressively diminish. FIG. 12b illustrates the variation of the vapour volume in the tanks 74 as a result of the evaporation/refilling cycle. When the liquid level reaches the lower limit, the switch 60 is actuated indicating to the controller 50 that evaporator 10 must be refilled. The controller 50 will then open VA and 42 for a period of time sufficiently long so that the pressure in the evaporator 10 drops below the pressure in the reserve tank 38 causing liquid $CO_2$ to flow in the evaporator 10 as a result of the pressure differential created. When the liquid level in the evaporator reaches the maximum, causing switch 58 to close, the controller 50 will shut off the valves VA and 42 to interrupt the transfer of liquid $CO_2$.

FIGS. 12c and 12d illustrate the $CO_2$ pressure variation in the gas reserve tanks 20 and 22, and the velocity of the $CO_2$ gas leaving the tanks respectively, for the above operating conditions. It will be appreciated that the $CO_2$ velocity is constant, thus driving the blowers 30 and 32 very regularly at a fast rate.

When the heat penetrating inside the enclosure is less, the heat absorption of the system has to be reduced by raising the vent opening and closing pressures, reducing the spread between the vent opening and closing pressures and reducing the number of vent valves allowed to open. The heat absorption rate of the system is automatically further reduced with lesser heat penetration. At a very low heat absorption rate, only VA will be allowed to operate. This condition is illustrated in FIG.

11a to 11d. By comparison with FIGS. 12a to 12d, it will be noted that the pressure in the gas reserve tank 22 is more irregular resulting into a jerky blower operation, which even stops for a short time period. However, generally speaking, the blower remains in operation most of the time, thus alloWing to obtain an adequate ventilation.

The liquid transfer from the reserve tank 38 causes the pressure therein to drop slightly as illustrated in FIGS. 11a and 12a. In order to repressurize the tank 38 for the next refilling cycle, the valve 46 in the gas line 44 is opened to transfer high pressure $CO_2$ from the evaporator to the reserve tank 38 until it reaches the original pressure in the reserve tank 38.

When the sensor 56 indicates a negative temperature outside and when the sensor 54 indicates a decrease of the temperature inside the enclosure compared to the set point, this is an indication that there is a need for heat instead of cold. In this case, the controller 50 closes valve 42 and opens valve VA to provide gas pressure from the evaporator 10 to operate the glow and the electric motor of the diesel heater 300 with the 12V battery 62 which is recharged by the generator 64. Meanwhile the warm air generated by the diesel heater circulates inside the duct system 36 as it is forced by the bloWer 30 driven by the gas motor 28.

The air which is warmed up by the diesel heater 300 is aspirated from the enclosure by duct 302 before it is mixed up with air coming by duct 36, so the temperature of the warm air is modulated to the needs.

Located after the exit of the diesel heater 300 is a small heat exchanger 304 able to vaporize some liquid $CO_2$ coming from the reserve tank 38 when a valve 65 is opened to inject some gas $CO_2$ in the line 14 and to guarantee a minimum pressure of 95 PSI inside the evaporator 10 and the associated piping As the evaporator never goes under 95 PSI there is no problem to refill the evaporator with fresh liquid $CO_2$ and reestablish the required pressure inside the evaporator whenever there is need for cooling anew without running the risk of generating dry snow.

Although the invention has been described with relation to a preferred embodiment, it should be understood that various changes and modifications obvious to one having the ordinary skill in the art may be made without departing from the scope of the invention. For example, cryogens other than $CO_2$ may be used such as nitrogen, oxygen, argon, hydrogen, helium, methane, freons, and carbon monoxyde. The scope of the invention is defined in the annexed claims.

What is claimed is:

1. A cooling system for an insulated enclosure, comprising,
    an evaporator thermally coupled to said enclosure, said evaporator containing cryogen in liquid and gaseous phases, heat from said enclosure transferred to said evaporator causing cryogen therein to convert from said liquid to said gaseous phase which increases the pressure in said evaporator;
    vent means coupled to said evaporator, said vent means being capable to assume opened and closed conditions, in said opened condition said vent means releasing gaseous cryogen from said evaporator to reduce the pressure therein, in said closed condition said vent means preventing release of cryogen from said evaporator;
    control means for commanding said vent means to assume said opened and closed conditions at respective and predetermined vent opening and closing pressures of cryogen in said evaporator, said control means constituting means for varying the pressure differential defined between said vent opening and closing pressures of cryogen in accordance with the heat absorption rate of said cooling system for regulating the rate of cryogen discharge from said evaporator in accordance with said heat absorption rate;
    ventilation means for creating an air current in said enclosure, including:
      (a) duct means for conveying air; and
      (b) gas powered fan means in said duct means to propel air therein, said vent means being coupled to said fan means for supplying thereto operating gaseous cryogen.

2. A cooling system as defined in claim 1, wherein said control means constitutes means to increase said pressure differential with increasing heat absorption rate.

3. A cooling system as defined in claim 1, further comprising a pressure sensor in said evaporator, said control means being responsive to said pressure sensor.

4. A cooling system as defined in claim 3, further comprising a temperature sensor in said enclosure, said control means being responsive to said sensors.

5. A cooling system as defined in claim 1, Wherein said evaporator comprises:
    a plurality of conduits generally horizontally extending and containing liquid cryogen;
    a feeding tank containing liquid cryogen above said conduit and being coupled thereto to cause liquid cryogen to flow from said feeding tank to said conduits by gravity; and
    a gas return passage means connecting said conduits to a top portion of said feeding tank.

6. A cooling system as defined in claim 5, further comprising:
    a cryogen reserve tank;
    conduit means establishing a fluid path between said cryogen reserve tank and said feeding tank; and
    valve means in said conduit means controlling the flow of cryogen therethrough.

7. A cooling system as defined in claim 6, further comprising a liquid level detection means coupled to said feeding tank for detecting the level of liquid cryogen therein, said valve means being responsive to said liquid level detection means.

8. A cooling system as defined in claim 7, wherein said liquid level detecting means comprises maximum and minimum level switches mounted in said feeding tank, actuation of said minimum level switch causing said valve to open allowing cryogen to flow from said reserve tank to said feeding tank, upon actuation of said maximum level switch said valve means interrupting cryogen flow in said conduit means.

9. A cooling system as defined in claim 6, further comprising a gas return line between said evaporator and said cryogen reserve tank for transferring high pressure gaseous cryogen from said evaporator to said cryogen reserve tank, and valve means in said gas return line to control the fluid flow therein, whereby establishing a predetermined pressure level in said cryogen reserve tank.

10. A cooling system as defined in claim 6, wherein said cryogen reserve tank is insulated for limiting heat infiltration therein.

11. A cooling system as defined in claim 1, further comprising conduit means between said vent means and said fan means, said conduit means conveying vaporized cryogen driving said fan means.

12. A cooling system as defined in claim 11, wherein said conduit means includes a gas reserve tank for storage of vaporized cryogen.

13. A cooling system as defined in claim 12, wherein said valve means is pressure responsive to establish a fluid path between said gas reserve tanks when the pressure in one of said tanks reaches a predetermined level.

14. A cooling system as defined in claim 12, wherein said conduit means includes two gas reserve tanks for receiving vaporized cryogen, passage means between said tanks, and valve means in said passage means for controlling exchange of vaporized cryogen between said tanks.

15. A cooling system as defined in claim 12, wherein said vent means comprises a plurality of valves individually controllable for regulating the flow rate of cryogen escaping from said evaporator.

16. A cooling system as defined in claim 15, wherein said conduit means includes a plurality of gas reserve tanks for receiving vaporized cryogen, each of said valves being associated with a given gas reserve tank through a predetermined fluid path, allowing to selectively feed said gas reserve tanks in accordance with the flow rate of cryogen escaping from said evaporator.

17. A cooling system as defined in claim 1, further comprising a pressure reducer in a fluid path between said evaporator and said vent means.

18. A cooling system as defined in claim 1, wherein said fan means comprises:
first blower means;
a gas motor in driving relationship with said blower fan means;
second blower means; and
a pressure responsive transmission means between said gas motor and said second blower means to establish a driving relationship therebetween when the pressure of vaporized cryogen supplied to said gas motor exceeds a predetermined level.

19. A cooling system as defined in claim 1, wherein said control means includes an electronic processing circuit, said cooling system further including a gas powered generator means coupled to said electronic processing circuit for supplying electric power thereto, said gas powered generator means being coupled to said vent means for receiving therefrom operating gaseous cryogen.

20. A cooling system as defined in claim 1, wherein said cryogen is $CO_2$.

21. A transport vehicle, comprising:
a top wall;
a bottom wall;
side walls, said walls defining an insulated enclosure;
door means on one of said walls for accessing said enclosure;
a cooling system for said enclosure, including:
(a) an evaporator mounted to said top wall, said evaporator containing cryogen in liquid and gaseous phases, heat from said enclosure transferred to said evaporator using cryogen therein to convert from said liquid to said gaseous phase which increases the pressure in said evaporator;
(b) vent means coupled to said evaporator, said vent means being capable to assume opened and closed conditions, in said opened condition said vent means releasing gaseous cryogen from said evaporator to reduce the pressure therein, in said closed condition said vent means preventing release of cryogen from said evaporator;
(c) control means for commanding said vent means to assume said opened and closed conditions, at respective and predetermined vent opening and closing pressures of cryogen in said evaporator, said control means constituting means for varying the pressure differential defined between said vent opening and closing pressures of cryogen in accordance with the heat absorption rate of said cooling system for regulating the rate of cryogen discharge from said evaporator in accordance with said heat absorption rate:
(d) ventilation means for creating an air current in said enclosure, including,
(i) duct means for conveying air; and
(ii) gas powered fan means in said duct means to propel air therein, said vent means being coupled to said fan means for supplying thereto operating gaseous cryogen.

22. A transport vehicle, as defined in claim 21, further comprising:
conduit means between said vent means and said fan means, said conduit means conveying vaporized cryogen driving said fan means:
a gas reserve tank in said conduit means for storage of vaporized cryogen; and
pressure reducer means between said evaporator and said gas reserve tank for reducing the pressure of cryogen in said gas reserve tank with respect to the pressure of cryogen in said evaporator.

23. A transport vehicle as defined in claim 22, wherein said gas reserve tank is mounted adjacent said bottom wall for absorbing heat passing therethrough.

24. A transport vehicle as defined in claim 23, wherein said gas reserve tank is shaped to extend along a substantial portion of the surface of said bottom wall.

25. A transport vehicle as defined in claim 24, comprising a conduit means between said vent means and said gas reserve tank, adjacent said door means.

26. A transport vehicle as defined in claim 22, further comprising exhaust conduit means to evacuate cryogen from said fan means, said exhaust conduit means extending along said duct means for absorbing heat therefrom.

27. A temperature control system for an insulated enclosure, comprising,
a cooling system for an insulated enclosure, comprising:
an evaporator thermally coupled to said enclosure, said evaporator containing cryogen in liquid and gaseous phases, heat from said enclosure transferred to said evaporator causing cryogen therein to convert from said liquid to said gaseous phase which increases the pressure in said evaporator;
vent means coupled to said evaporator, said vent means being capable to assume opened and closed conditions, in said opened condition said vent means releasing gaseous cryogen from said evaporator to reduce the pressure therein, in said closed condition said vent means preventing release of cryogen from said evaporator:
control means for commanding said vent means to assume said opened and closed conditions at respective and predetermined vent opening and closing pressures of cryogen in said evaporator, said control means constituting means for varying the pressure differential defined between said vent opening and closing pressures of cryogen in accordance with the heat absorption rate of said cooling system for regulating the rate of cryogen discharge from said evaporator in accordance with said heat absorption rate;

ventilation means for creating an air current in said enclosure, including,
  (a) duct means for conveying air; and
  (b) gas powered fan means in said duct means to propel air therein, said vent means being coupled to said fan means for supplying thereto operating gaseous cryogen.

a heating unit coupled to said duct means for supplying warm air in said enclosure.

28. A temperature control system as defined in claim 27, further comprising,
  cryogen reserve tank for supplying said evaporator with liquid cryogen;
  a gas powered generator means coupled to said heating unit for supplying electric power thereto; and
  conduit means between said cryogen reserve tank and said gas powered generator means for supplying thereto operating gaseous cryogen.

29. A temperature control system as defined in claim 28, further including a heat exchanger in said conduit means, thermally coupled to said heating unit, said heat exchanger enhancing vaporization of cryogen.

30. A temperature control system as defined in claim 28, wherein said cryogen reserve tank is insulated for limiting heat infiltration therein.

31. A cooling system for an insulated enclosure, comprising:
  an evaporator thermally coupled to said enclosure, said evaporator containing cryogen in liquid and gaseous phases, heat from said enclosure transferred to said evaporator causing cryogen therein to convert from said liquid to said gaseous phase which increases the pressure in said evaporator;
  vent means coupled to said evaporator for releasing gaseous cryogen therefrom to reduce the pressure in said evaporator;
  control means for controlling the opening and closing operation of said vent means to cause a generally cyclical pressure variation in said evaporator having an amplitude selected in accordance with the desired heat absorption rate of said cooling system; and
  ventilation means for creating an air current in said enclosure, including:
    (a) duct means for conveying air; and
    (b) gas powered fan means in said duct means to propel air therein, said vent being coupled to said fan means for supplying thereto operating gaseous cryogen.

32. A cooling system as defined in claim 31, wherein said vent means is of the variable flow rate type, said control means regulating the flow rate capacity of said vent means in accordance with the heat absorption rate of said cooling system.

33. A method for cooling an insulated enclosure, comprising the steps of:
  providing an evaporator thermally coupled to said enclosure;
  placing cryogen in liquid and gaseous phases into said evaporator;
  transferring heat from said enclosure to said evaporator causing cryogen therein to convert from a liquid to a gaseous phase to increase pressure in said evaporator;
  providing vent means coupled to said evaporator, enabling said vent means to assume opened and closed conditions and releasing gaseous cryogen from said evaporator to reduce the pressure therein in said open condition and preventing release of cryogen from said evaporator in said closed condition;
  providing control means for commanding said vent means to assume said opened and closed conditions at respective and predetermined vent opening and closing pressures of cryogen in said evaporator, and varying by said control means a pressure differential defined between said vent opening and closing pressures of cryogen in accordance with the heat absorption rate of said evaporator for regulating the rate of cryogen discharge from said evaporator in accordance with said heat absorption rate;
  providing ventilation means including duct means and gas powered fan means for creating an air current in said enclosure; and
  coupling said vent means to said ventilation means for supplying thereto operating gaseous cryogen.

* * * * *